A. B. TAYLOR.
DRILLING AND LAPPING MACHINE.
APPLICATION FILED JULY 17, 1914.
1,318,466.
Patented Oct. 14, 1919.
3 SHEETS—SHEET 3.
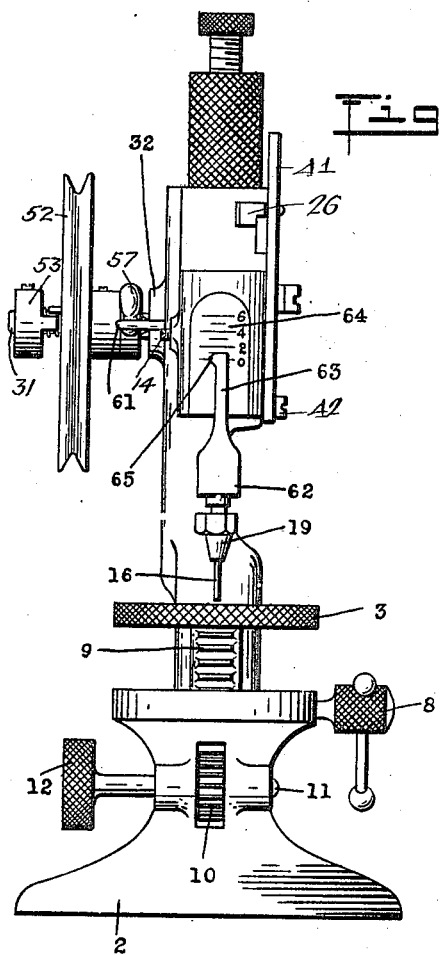
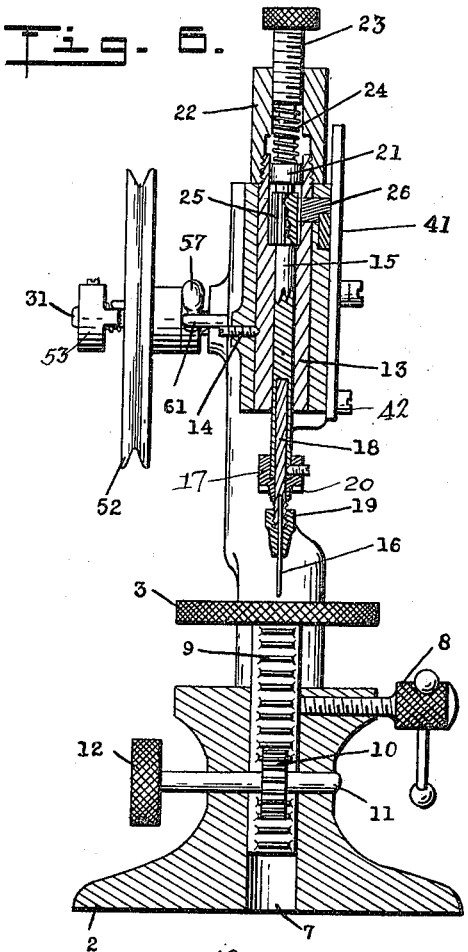
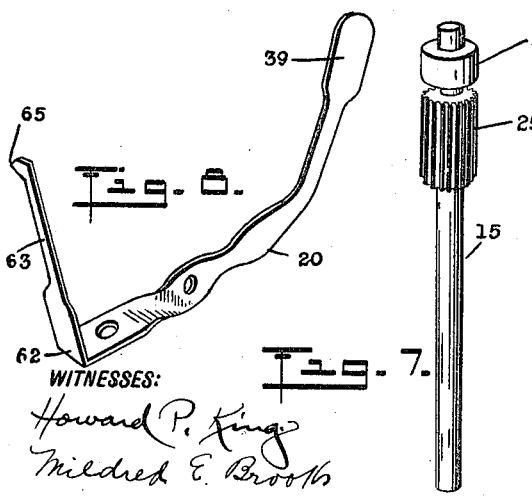
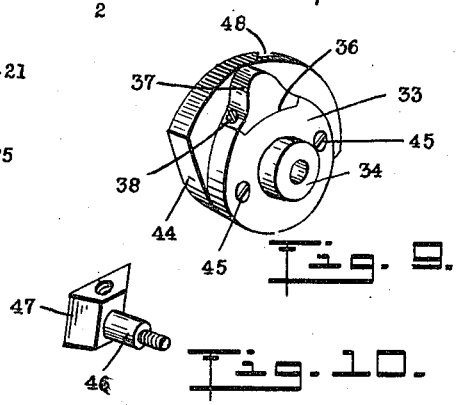
WITNESSES:
Howard P. King
Mildred E. Brooks
INVENTOR:
Arthur B. Taylor,
BY Russell M. Everett,
ATTORNEY.

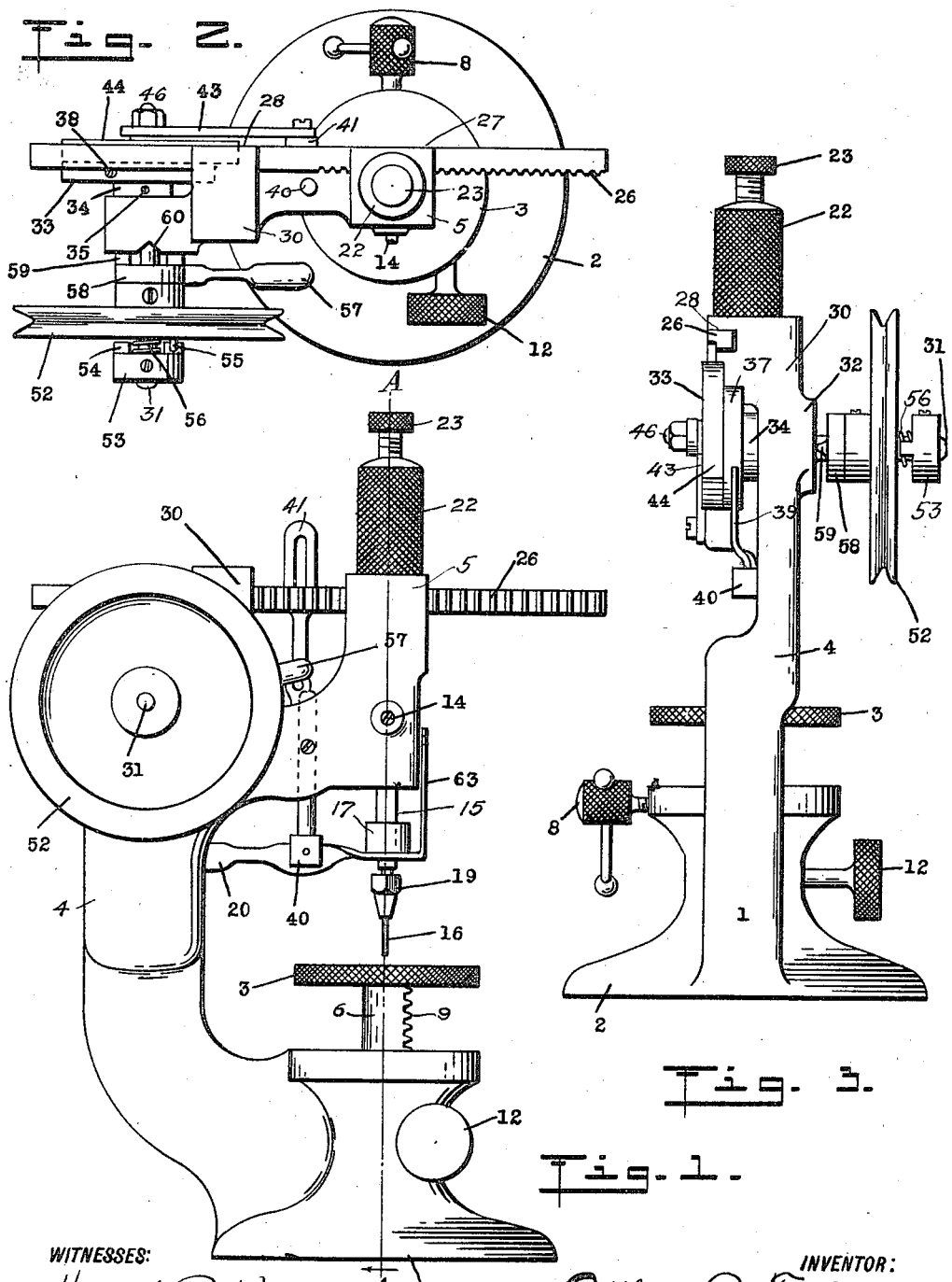

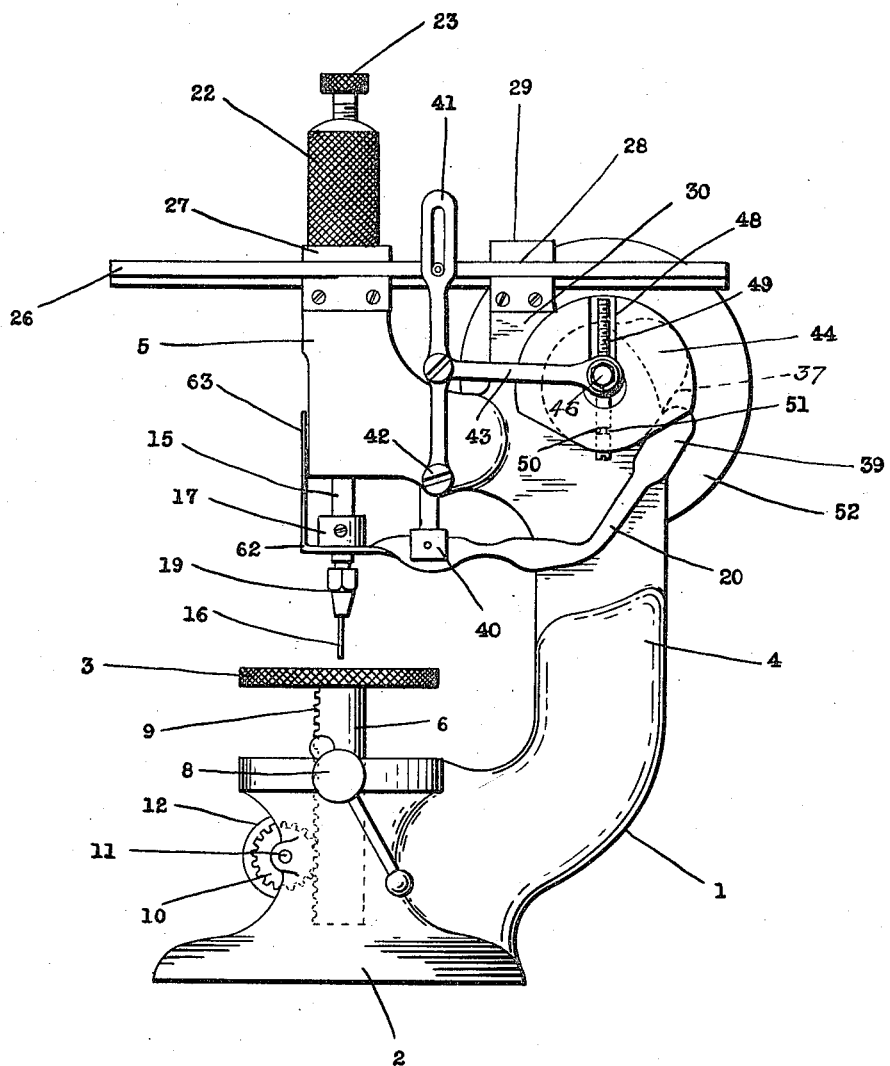

UNITED STATES PATENT OFFICE.

ARTHUR B. TAYLOR, OF HILLSIDE TOWNSHIP, UNION COUNTY, NEW JERSEY, ASSIGNOR TO BAKER AND COMPANY, INCORPORATED, A CORPORATION OF NEW JERSEY.

DRILLING AND LAPPING MACHINE.

1,318,466.   Specification of Letters Patent.   Patented Oct. 14, 1919.

Application filed July 17, 1914. Serial No. 851,461.

*To all whom it may concern:*

Be it known that I, ARTHUR B. TAYLOR, a citizen of the United States, and a resident of Hillside township, in the county of Union and State of New Jersey, have invented certain Improvements in Drilling and Lapping Machines, of which the following is a specification.

This invention relates more especially to that class of drilling and lapping machines which are used upon diamonds, sapphires and other hard stones or brittle substance which it is desired to perforate rapidly, neatly and exactly as for use in jewelry, dies for wire drawing and other commercial uses, the tool or drill not cutting directly but through the medium of diamond dust or other like abrasives.

The objects of the invention are to provide such a machine in which a tool can be given both oscillating and reciprocating movements; to secure such a machine in which the movements of the tool will take place automatically; to enable the movement of the tool and particularly its longitudinal movement to be regulated as desired; to provide means for varying the speed of the tool; to provide in combination with such a tool a work table which can be adjusted toward and away from the tool; to thus enable the machine to be set with reference to a certain piece of work so as to cut a predetermined depth and then stop cutting; to provide indicating means for this purpose; to secure a simple, compact and efficient construction, and to obtain other advantages and results as may be brought out in the following description.

Referring to the accompanying drawings, in which like numerals of reference indicate the same parts throughout the several views, Figure 1 is a side elevation of my improved machine;

Fig. 2 is a plan of the same;

Fig. 3 is a rear edge view of the machine;

Fig. 4 is an elevation from the side opposite that shown in Fig. 1;

Fig. 5 is a front edge view;

Fig. 6 is a vertical section on line A—A Fig. 1;

Fig. 7 is a detail view of the tool spindle;

Fig. 8 is a detail view of a certain cam lever for reciprocating the tool;

Fig. 9 is a detail view of the cam, and

Fig. 10 is a detail view of an adjustable crank pin for the crank disk.

In the specific embodiment of the invention shown in said drawings, 1 indicates a frame or body portion having a base 2 adapted to stand upon a suitable supporting surface and carry a work table 3, the middle of the frame or body portion 1 being offset or carried out to one side as at 4 to support the upper tool-carrying portion 5 directly above the work table and give clearance for the tool and work table as is common in drill presses and the like. The said frame or body portion is preferably a single casting, but it may be constructed in any suitable manner. The work table 3 has a depending post 6 slidable in a socket 7 in the base 2 so that the table can be adjusted to different heights and held there by a set screw 8. I have shown such adjustment effected by a rack 9 formed on the post 6 and a pinion 10 engaging therewith and fast on a stem 11 mounted in the base 2 and adapted to be turned by a finger piece 12. Any other detail construction of adjustable table may be used, however, and any suitable adjusting means employed.

The upper tool-carrying portion 5 of the frame of the machine is bored vertically and preferably in alinement with the post 6 of the work table to receive a bushing 13 which may be held by a set screw 14 or any other equivalent means, said bushing providing bearings for the tool spindle 15. This tool spindle projects at its lower end below the bushing 13 and tool-carrying portion 5 of the machine frame and carries a tool in any suitable manner. In the drawings I have shown an end piece 17 fitted telescopically on the end of the spindle and perforated in alinement therewith to receive the stock 18 of a chuck 19 for the tool 16, said end piece having a lateral set screw which works through the hole in the side of the spindle to clamp the chuck. The spindle might receive the tool direct, however, or any other suitable or equivalent construction be employed, instead of the details described. The lower end of the end piece 17 is reduced and enters the end of a cam lever 20, hereinafter more fully described.

The upper end of the bearing for the drill spindle 15 in the bushing 13 is preferably enlarged and the spindle preferably has a collar 21 bearing against the walls of said enlargement, an end portion of the spindle projecting beyond said collar. A cap 22 is shown screwed upon the upper end of the bushing 13, and into the upper end of said cap is threaded a screw 23 having a helical spring 24 between its inner end and the collar 21 on the spindle. Obviously, by moving the screw 23 up or down, by its knurled head, the spring pressure upon the spindle to hold it downward may be varied. Furthermore, the spindle has fixed upon itself in the enlarged portion of its bearing and directly beneath the collar 21 a long pinion 25 which is engaged by a rack 26 sliding in ways 27, 28 on the machine frame 1, preferably in the plane of said frame. Said ways are formed, preferably, one 27, on the upper tool-carrying portion 5 of the frame and the other 28 in the top 29 of an upward projection 30 of the frame, said projection extending upward from the lateral offset portion of the frame and being of less thickness than the frame as shown.

It is in this projection 30 of the frame that a driving shaft 31 is preferably mounted perpendicular to the plane of the frame and in a bearing 32 formed thereon. Said driving shaft 31 carries at the side of the projection 30 which is thinned, a cam disk 33 made fast on the shaft by a hub 34 and set screw 35, and having at one edge of itself as at 36 a seat for a peripheral cam 37. Said cam 37 as shown in Fig. 9 is preferably secured by screws 38, 38, whereby it can be taken off and other cams of different form or throw, put in its place, although obviously the cam and disk could be integral if desired without departing from the invention. Against the edge of said cam 37 and disk 33 bears the arm 39 of the cam lever 20, said cam lever being pivoted upon a stud 40 depending from the overhang of the frame 1 and being connected at its other end to the spindle end piece 17 as has been explained. Said lever 20 is preferably made of heavy sheet metal with its tool end twisted into a horizontal plane to receive the spindle end piece, but obviously it might be otherwise constructed. This cam lever thus swings substantially in the vertical plane of the machine frame, and obviously as the cam disk 33 and its cam rotate, the tool spindle 15 will be alternately forced upward by the cam and downward by the spring at the upper end of the spindle.

A rack lever 41 is pivoted at one end to the side of the overhang of the frame, as at 42; and slotted at its opposite end to receive a pin on the rack 26, and a link 43 is pivoted at one end to said lever 41 intermediate the ends thereof, and eccentrically connected at its other end to a crank disk 44 fast on the driving shaft 31 adjacent the cam disk 33. I have shown the said crank disk fastened flatwise to the crank disk by screws 45, 45, but obviously any other suitable arrangement could be made without departing from the scope of the invention. The link 43 thus serves to reciprocate the rack 26 as the driving shaft 31 revolves and thus oscillates the tool spindle with a back and forth movement first in one direction and then in the other, as will be understood.

In operation, the shaft 31 is simply rotated, which reciprocates the rack 26 and causes the tool spindle to oscillate, and at the same time the cam 37 swings the lever 20 up and down to alternately raise the tool spindle and allow it to descend again. In this way a simultaneously oscillating and "pecking" action of a tool is secured, by which means it rapidly makes a hole, with the aid of diamond dust or the like, in the most refractory substances. It will be understood that the action of the machine is very rapid, the driving shaft being rotated at something like 2500 revolutions a minute. Any kind of a suitable tool can of course be used, as desired by those skilled in the art, as for instance a tool which cuts by its own sharpness and hardness as well as a lapping tool, a core drill as well as a solid drill, and any other kind of tools adapted to be used in the machine.

It has been indicated herein that the vertical reciprocation of the tool spindle can be varied by using cams 37 of different throw, and it is also advantageous to provide means for varying the travel of the rack 26 which oscillates the tool spindle. I have therefore illustrated such means by showing the link 43 connected to the crank disk 44 by means of an adjustable pin 46. That is to say, the pin 46 has a dove-tailed base 47, see Fig. 9, adapted to slide in a radial slot 48 of the crank disk such sliding being accomplished by means of a screw 49 extending longitudinally of said slot 48 through the base 47 and being free to rotate although held against longitudinal movement in the crank disk, as by a pin 50 entering an annular groove 51 in the screw. Any other suitable adjusting means might be employed, however, as occurs to those skilled in the art. Obviously, as the eccentricity of the crank pin 46 is increased, or diminished, the range of travel of the crank 26 is increased or diminished and the arc through which the tool spindle turns before reversing its direction of turning likewise increased or diminished. In perforating some articles as for instance very thin brittle ones, the tool cannot turn through more than a very small arc without fracturing the article.

The driving shaft 31 may be driven in any suitable way but I have shown for purposes of illustration a belt pulley 52 thereon, and furthermore I have shown said belt pulley normally loose with a clutch for causing it to rotate the driving shaft when desired, as I have found this to be desirable in practice. Any kind of a clutch may be employed, but in the one which I have shown a collar 53 fast on the shaft 31 outside of the pulley 52 has teeth 54, 54 adapted to engage with a lateral pin 55 on the pulley, a spring 56 between said pulley and collar normally holding them out of engagement so that the pulley runs idle. To throw the clutch in, a clutch lever 57 has an annular portion 58 upon the shaft 31 between the hub of the pulley 52 and the side of the shaft bearing in the frame projection 30, said annular portion having V-cams 59, 59 on its side which enter similar shaped recesses 60, 60 therefor in the bearing when the lever stands upright, thus allowing the spring 56 to throw the driving pulley into idle position. When the clutch lever 57 is thrown down against a stop 61 the cams 59, 59 ride up onto the outer end surface of the bearing and force the driving pulley toward the collar 53 so that their teeth engage.

If, in using the machine, a piece of work is brought up against the point of the tool, by means of the table elevating mechanism, and such upward movement continued until the tool is raised say an eighth of an inch, then if the machine is started the tool will operate or cut to a depth of exactly one-eighth of an inch and stop. This is because the lowest position of the tool is determined by engagement of the arm 39 of the cam lever 20 with the periphery of the cam disk 33, so that when work is brought up against the point of the tool to raise it a given height or move the said lever arm 39 away from the crank disk 33 a given distance, the tool will cut to a proportionate distance when the machine is started. This enables an operator to set the machine to cut any given or desired distance and then leave it without any particular attention, so that one operator can, if desired, operate a plurality of machines. For greater convenience in setting the machine to cut a given depth, I prefer to provide an indicator and have illustrated the same as applied to the arm of the cam lever 20 which engages the tool spindle 15, although obviously it might be applied in various other places as will be understood by those skilled in the art. In the construction which I have shown the end of the lever 20 is bent upward just beyond the end piece 17 of the spindle 15, as at 62, to form an indicating pointer 63 closely adjacent to a graduated scale 64 formed on the front of that portion of the frame 1 which carries the tool spindle, as clearly shown in Fig. 5. The end of the pointer 62 has a finger 65 which normally stands at zero when the tool is in its lowest position, and obviously as the tool is raised by a piece of work to be done, the amount of such raise will be indicated by the finger 65 moving upward over the graduated scale. The operator can thus tell at a glance just how to set his work in order to cut to a given depth.

Obviously detail modifications may be made in manufacturing my improved drilling and lapping machine without departing from the spirit and scope of the invention, and I do not wish to be understood as limiting myself except as required by the following claims when construed in the light of the prior art.

Having thus described the invention, what I claim is:

1. In a machine of the character described, the combination of a frame providing a tubular bearing enlarged at one end, a spindle in said bearing having a collar fitting the outer end portion of said enlargement and a pinion between said collar and the inner end of said enlargement, a cap for the enlarged end of the bearing, and a rack projecting through the wall of the bearing and engaging said pinion.

2. In a machine of the character described, the combination of a frame providing a horizontally disposed tool-carrying portion, a spindle mounted vertically in one end of said tool-carrying portion, a lever fulcrumed on the lower part of said tool-carrying portion and engaging the spindle to reciprocate the same, a rack mounted horizontally on the upper part of the tool carrying portion and engaging pinion teeth on the spindle, a vertically disposed rack lever fulcrumed on said tool-carrying portion intermediate its ends and engaging said rack, a horizontal shaft journaled in the end of said tool-carrying portion away from the spindle transverse to the plane of the spindle lever and rack, means on said shaft for tripping said spindle lever, and a link eccentrically connected to said shaft and engaging the rack lever to swing the same.

ARTHUR B. TAYLOR.

Witnesses:
ALVIN M. WILLIAMS,
RUSSELL M. EVERETT.

Copies of this patent may be obtained for five cents each, by addressing the "Commissioner of Patents, Washington, D. C."